(No Model.)
H. STANLEY & N. CORNELIUS.
GEAR WHEEL.
No. 277,802. Patented May 15, 1883.
Fig. 1.
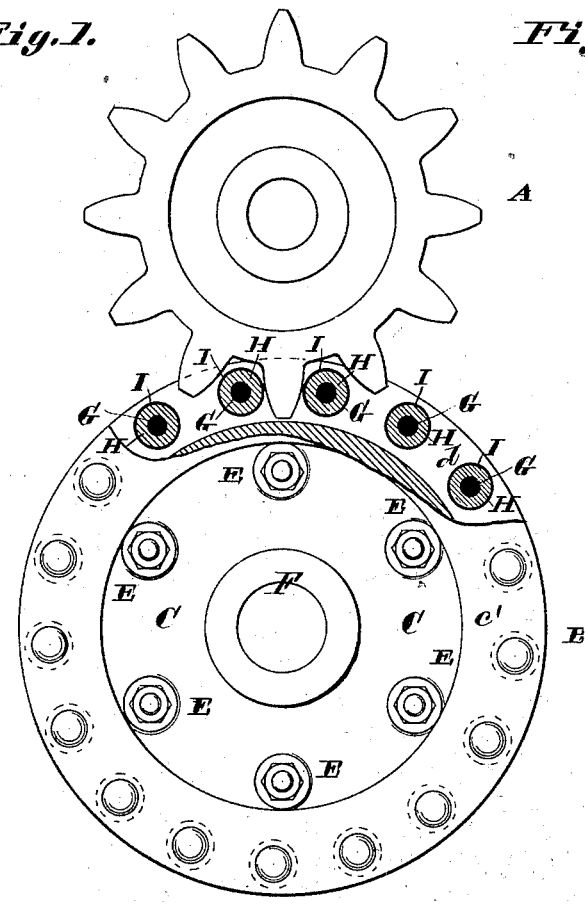
Fig. 2.
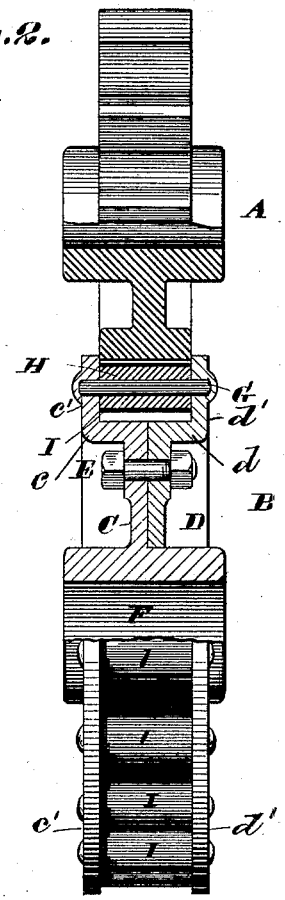
Fig. 3. Fig. 4.
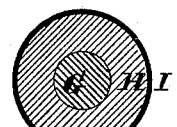 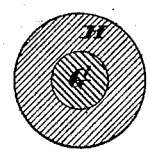
Fig. 5.
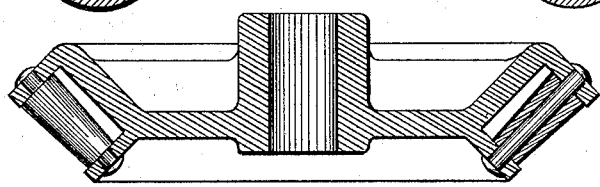
Attest:
Wm. J. Sayers
Herbert Knight
Inventor:
Henry Stanley
Nicholas Cornelius
By Knight Bros
Attys

UNITED STATES PATENT OFFICE.

HENRY STANLEY AND NICHOLAS CORNELIUS, OF ST. LOUIS, MISSOURI.

GEAR-WHEEL.

SPECIFICATION forming part of Letters Patent No. 277,802, dated May 15, 1883.

Application filed January 15, 1883. (No model.)

*To all whom it may concern:*

Be it known that we, HENRY STANLEY and NICHOLAS CORNELIUS, both of the city of St. Louis, in the State of Missouri, have invented a certain new and useful Improvement in Gear-Wheels, of which the following is a full, clear, and exact description, reference being had to the accompanying drawings, forming part of this specification, and in which—

Figure 1 is a side view, with part of our improved wheel broken away. Fig. 2 is an edge view, part in section. Figs. 3 and 4 are transverse sections of the rollers forming the cogs of our improved gear-wheel, and Fig. 5 is a section of a bevel or miter wheel embodying our improvement.

Our invention relates to an improved gear-wheel to be used with one of common construction or form, or one not of its own kind; and our invention consists in points of novelty hereinafter fully described and claimed.

Referring to the drawings, A represents a gear-wheel of common construction, and B our improved wheel, which closely resembles a lantern-wheel, except as to certain features of novelty, hereinafter claimed. The body of the wheel is made in two disks or parts, C and D, connected by suitable bolts, E, the part C formed in one part with or secured to the hub F. The disks have projecting rims $c'$ and $d'$, forming shoulders $c$ and $d$.

G represents pins placed suitable distances apart in depressions in the rims of the wheel, their opposite ends bearing, respectively, in the two parts C and D of the wheel, as shown. Surrounding each of these pins is a roller, H, made from some anti-friction material—as, for instance, vulcanized fiber—and these rollers are preferably surrounded by sleeves I, of metal. When the sleeves are not used the rollers would turn on the pins, but where the sleeves are used they would turn on the rollers, the rollers being made to fit the pins tightly, so as not to turn thereon. By making the rollers of an anti-friction material it dispenses with the necessity of oiling the bearing-surfaces, which is a very inconvenient operation, owing to the difficulty of getting at them. The cogs of the wheel A mesh with the rollers of the wheel B, as shown.

A gear-wheel thus constructed is cheap and durable, and the wearing parts can easily and quickly be renewed by simply removing the part D of the wheel by taking the nuts off the bolts E and slipping the rollers off the pins, or the sleeves off the rollers, as the case may be. The pins preferably fit tightly in their sockets in the part C of the wheel, so that when the part D is removed they remain in the part C.

Fig. 5 illustrates a miter-wheel embodying our invention, the rollers being secured by pins with riveted ends; or, instead of the ends of the pins being riveted, one end may be formed with a thread and the other with a head, and then they would be screwed in place, and could be easily and quickly removed to renew the sleeves or rollers.

We claim as our invention—

1. A gear-wheel having roller-cogs, each cog consisting of pin G, roller H, of anti-friction material, and metal sleeve I, surrounding the roller, as set forth.

2. A gear-wheel consisting of the hub F, disk C, in one piece with the hub, having rim $c$ and shoulder $c'$, removable disk D, having rim $d$ and shoulder $d'$, bolts E, securing disks together, pins G, extending into depressions in the rims, and rollers H, mounted on said pins and formed of anti-friction material, all constructed substantially as and for the purpose set forth.

HENRY STANLEY.
NICHOLAS CORNELIUS.

Witnesses:
SAML. KNIGHT,
GEO. H. KNIGHT.